(12) United States Patent
Ikeda

(10) Patent No.: US 9,512,906 B2
(45) Date of Patent: Dec. 6, 2016

(54) TRANSMISSION DEVICE

(71) Applicant: Masayuki Ikeda, Kurate-gun (JP)

(72) Inventor: Masayuki Ikeda, Kurate-gun (JP)

( * ) Notice: Subject to any disclaimer, the term of this patent is extended or adjusted under 35 U.S.C. 154(b) by 0 days.

(21) Appl. No.: 14/764,406

(22) PCT Filed: Dec. 9, 2013

(86) PCT No.: PCT/JP2013/082977
§ 371 (c)(1),
(2) Date: Jul. 29, 2015

(87) PCT Pub. No.: WO2014/119138
PCT Pub. Date: Aug. 7, 2014

(65) Prior Publication Data
US 2015/0362045 A1 Dec. 17, 2015

(30) Foreign Application Priority Data
Feb. 1, 2013 (JP) .................................. 2013-018312

(51) Int. Cl.
*F16H 3/72* (2006.01)
*F16H 3/70* (2006.01)

(52) U.S. Cl.
CPC . *F16H 3/70* (2013.01); *F16H 3/72* (2013.01)

(58) Field of Classification Search
None
See application file for complete search history.

(56) References Cited

U.S. PATENT DOCUMENTS 1,740,788 A * 12/1929 Sheridan .................. F16H 3/56
475/1

FOREIGN PATENT DOCUMENTS

| JP | 46-4486 B | 2/1971 | |
| JP | 52-140767 A | 11/1977 | |
| JP | 58-69146 U | 5/1983 | |
| JP | 61-140243 U | 8/1986 | |
| JP | 3-7555 U | 1/1991 | |
| JP | 2006-117033 A | 5/2006 | |
| JP | 2008-174213 A | 7/2008 | |
| JP | 2009-127776 A | 6/2009 | |
| JP | 5280592 B1 * | 9/2013 | ............... F16H 3/72 |

OTHER PUBLICATIONS

International Search Report dated Feb. 10, 2014, issued in counterpart Application No. PCT/JP2013/082977 (2 pages).
Decision of Patent Grant dated May 14, 2013, issued in counterpart Japanese Patent Application No. 2013-018312, with English translation (4 pages).

* cited by examiner

*Primary Examiner* — Dirk Wright
(74) *Attorney, Agent, or Firm* — Westerman, Hattori, Daniels & Adrian, LLP

(57) ABSTRACT

A feature for joining gear wheels includes a disk portion 21 and external cogs 22 provided to an input means 12, a second cylindrical guiding portion 31 provided on one side of an internal/external gear wheel 15 and coaxial with a first cylindrical guiding portion 30, an external gear wheel 18 rotatably fit in and attached to the input means 12 and having external cogs 38 having a same shape as the external cogs 22 of the input means 12 and engaging with internal cogs 33 of the gear wheel 15, and an internal gear wheel 19 having the internal cogs 40 engaging with the external cogs 22 and the external cogs 38, having an annular guiding portion 39 to be guided by the second cylindrical guiding portion 31, arranged in between the disk portion 21 and the internal/external gear wheel 15, and revolving along with the gear wheel 15.

8 Claims, 2 Drawing Sheets

TRANSMISSION DEVICE

TECHNICAL FIELD

The present invention relates to a transmission device that controls rotations of an output means by making an internal/external gear wheel that is joined to an input means through internal cogs and also joined to the output means through external cogs revolve around a circumference of the input means.

BACKGROUND ART

A transmission device is an apparatus that changes torque and the number of rotations by interposing a single or a plurality of gear wheels and the like in between an input means (input axis) and an output means (output axis) such as an axle and by adjusting and controlling the number of rotations and the like of force having been input. Transmission devices are used in, for example, automobiles and the like, and a number of non-step transmission devices capable of continuously changing in a non-step manner and transmitting transmission gear ratios from input means have also been developed.

As one of such the transmission devices, a transmission device that controls rotations of an output means by using an internal/external gear wheel gear-coupled to an input means through internal cogs and to the output means through external cogs and by making the internal/external gear wheel revolve around a circumference of the input means has been developed by the inventor of the present invention (see Patent Literature 1). According to this transmission device, speed of rotations of the output means can be changed by just adjusting revolving speed of the internal/external gear wheel, which enables a reduction in the number of components forming the transmission device, thereby enabling achievement of a simplified and compact structure of the transmission device.

CITATION LIST

Patent Literature

Patent Literature 1: Japanese Unexamined Patent Application Publication No. 2009-127776

SUMMARY OF INVENTION

Technical Problem

Here, in the case of a transmission device described in Patent Literature 1, in order to prevent inverse rotations in a case where an output means becomes locked, the transmission device has a structure in which an input means is supported through a unidirectional clutch. Therefore, in the case of this transmission device, a speed change function functions in good condition only when rotating in a normal direction, and effects of the speed change function cannot be fulfilled in the same manner in the case of reverse rotations. Also, since the unidirectional clutch is provided, there is a limitation in a reduction in the number of components forming the transmission device and also in making the structure compact.

The present invention has been made in view of the above circumstances, and an object thereof is to provide a transmission device that is capable of changing speeds in the same manner in both normal rotations and reverse rotations, that requires a small amount of components and is compact, and that has a simple structure.

Solution to Problem

In order to achieve the above object, according to the present invention, there is provided a transmission device including a first driving means,
an input means rotatably supported and to be connected to the first driving means,
an eccentric guiding plate having an axial center aligned with the input means,
rotatably supported, and having an annular eccentric guiding portion on one side, the annular eccentric guiding portion having an axial center at an eccentric position different from the axial center of the input means,
a second driving means rotating the eccentric guiding plate,
an internal/external gear wheel formed opposed to the eccentric guiding plate, having a first cylindrical guiding portion to be guided by the eccentric guiding portion, and also having external cogs and internal cogs provided centering on a center position of the first cylindrical guiding portion, and
an output means having a same axial center as the input means and also having internal cogs engaging with the external cogs of the internal/external gear wheel, the internal cogs of the internal/external gear wheel being connected to a main axis portion of the input means through a feature for joining gear wheels, the internal/external gear wheel revolving along the eccentric guiding portion while rotating in accordance with a difference in the number of rotations between the input means and the eccentric guiding plate,
the feature for joining gear wheels including
a disk portion and external cogs forming the input means and provided coaxially,
a second cylindrical guiding portion provided on one side of the internal/external gear wheel with the axial center aligned with the first cylindrical guiding portion,
an external gear wheel rotatably set in and attached to the input means and having external cogs in a same shape as the external cogs of the input means and engaging with the internal cogs of the internal/external gear wheel, and
an internal gear wheel having internal cogs engaging with the external cogs of the input means and the external cogs of the external gear wheel, and also having an annular guiding portion to be guided by the second cylindrical guiding portion, the internal gear wheel arranged in between the disk portion and the internal/external gear wheel and revolving along with the revolving of the internal/external gear wheel.

Here, the internal cogs or external cogs do not refer to a separate, individual cog, but refer to a gear wheel structure formed of a plurality of cogs arranged inward or outward on a circumference of circle.

In the case of a transmission device according to the present invention, upon occurrence of a difference in the number of rotations between the input means and the eccentric guiding plate, each gear wheel and the like operates, and the internal/external gear wheel revolves around the input means along the eccentric guiding portion. Thus, by just controlling the revolving speed of the internal/external gear wheel, that is, by just controlling the number of rotations of the input means or the eccentric guiding plate, the speed of rotations of the output means can be changed. Especially, in the case of the transmission device according to the present invention, since the feature for joining gear wheels consists of gear wheels and the like as described earlier, the speed can be changed in the same manner in both the normal rotations and the reverse rotations. Additionally, the number of components forming the transmission device becomes small, making the transmission device compact, and the structure can be made simple as well.

In the case of the transmission device according to the present invention, it is preferred that the first driving means be used for controlling the number of rotations of the output means. This makes, for example, the number of rotations of the second driving means constant, enabling efficient control of the number of rotations of the output means.

In the case of the transmission device according to the present invention, it is preferred that the input means be supported by bearings in a manner that enables the input means to rotate in both normal and reverse directions. By using a bearing to support the input means in a manner that enables the input means to rotate normally and reversely as just described instead of using a unidirectional clutch and the like, a speed change function operates in good condition in both the normal rotations and the reverse rotations, which helps achieve an even more reduction in the number of components and an even more compact transmission device.

In the case of the transmission device according to the present invention, it is preferred that the first and second driving means each be a motor, and the second driving means rotate the eccentric guiding plate through a power transmitting means. In the case of the transmission device according to the present invention, it is preferred that the transmission device be for electric automobiles. In the case of the transmission device according to the present invention, as described above, controlling the number of rotations of at least one of the two driving means enables the speed of the output means to be changed efficiently, and also makes it possible to cope with both the normal and reverse rotations. Thus, in a case where motors are used as the driving means, power of these motors can be utilized effectively. Therefore, the transmission device according to the present invention can be used suitably as, for example, one for electric automobiles and the like.

Advantageous Effects of Invention

By the use of the transmission device according to the present invention, speed can be changed in the same manner in both the normal rotations and the reverse rotations, the number of components becomes small, the transmission device can be made compact, and a simplified structure can be achieved as well.

DESCRIPTION OF EMBODIMENTS

Next, with reference to the accompanying drawings, descriptions will be given on embodiments of the present invention.

Figure 1:
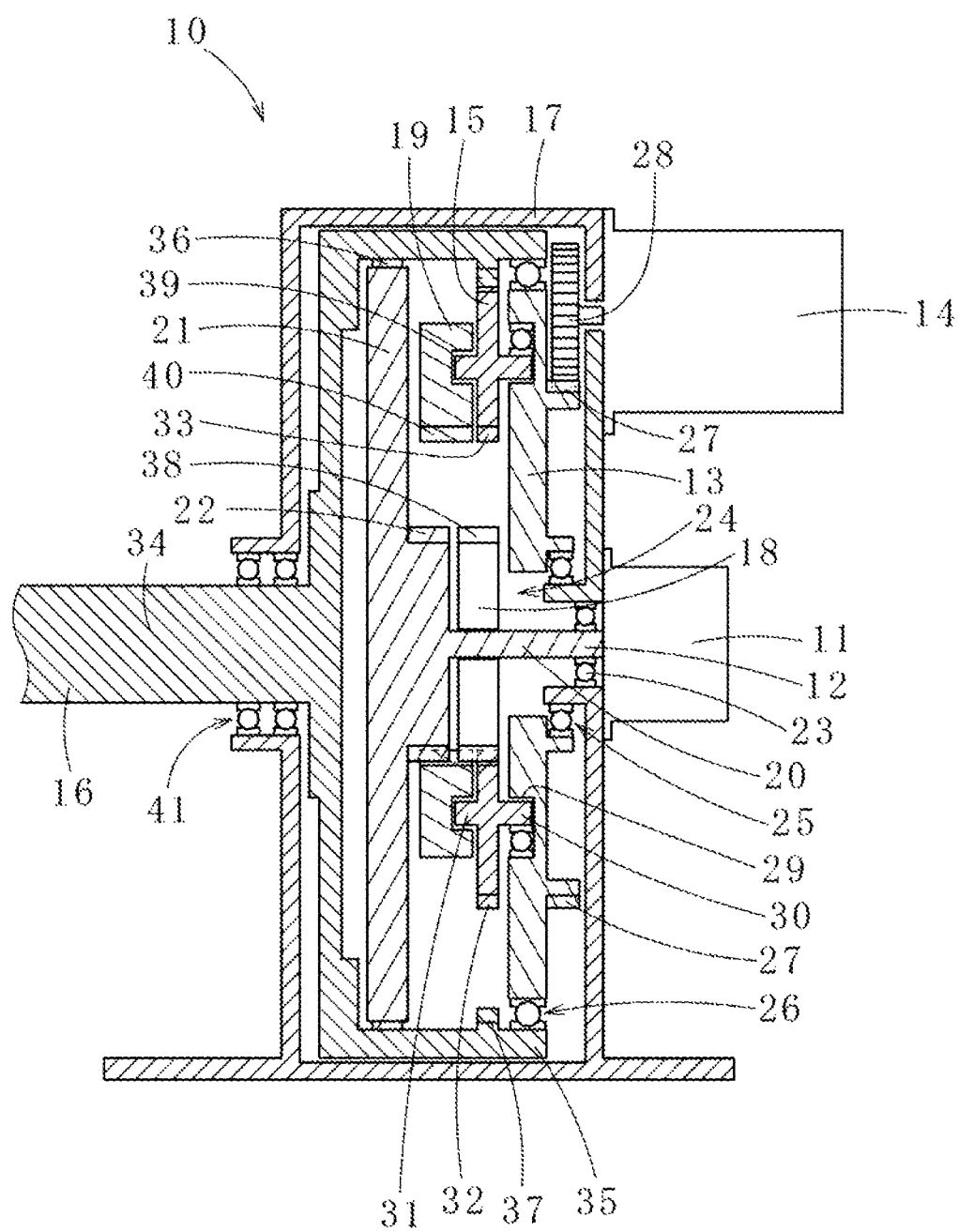
FIG. 1 is a schematic side sectional elevation of a transmission device according to one embodiment of the present invention.
Figure 2:
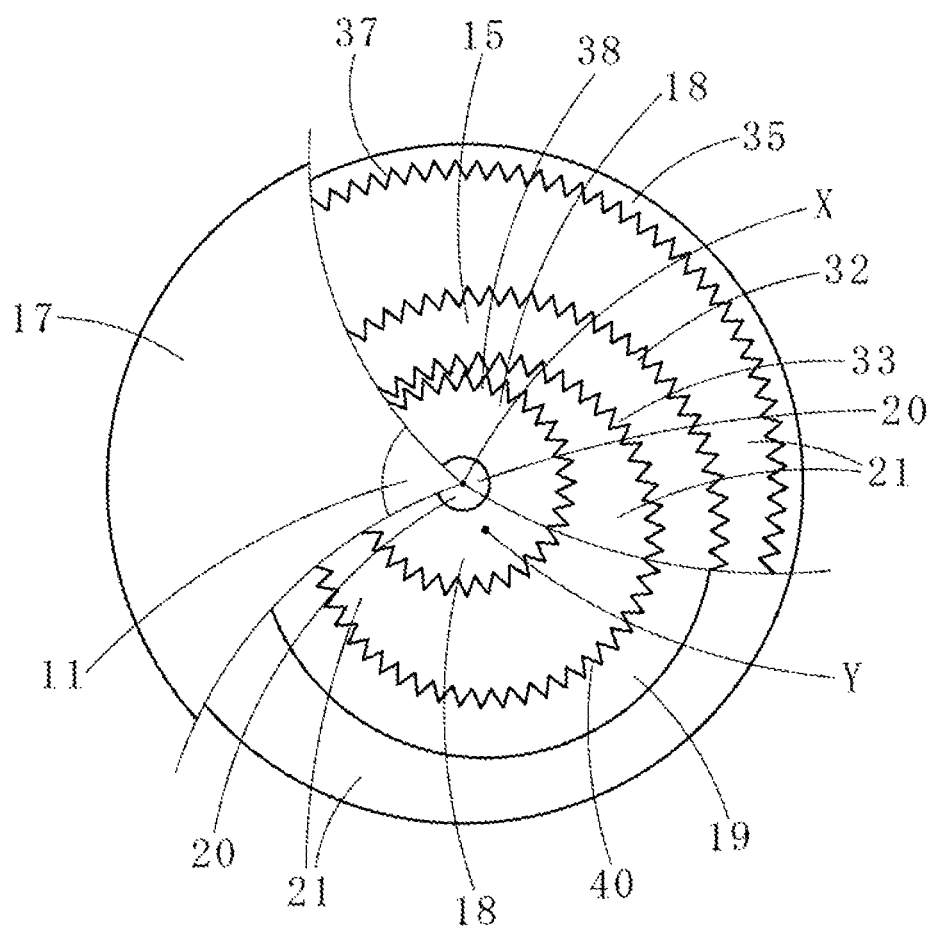
FIG. 2 is a schematic front elevation of a partial cutout of the same transmission device.

As illustrated in FIGS. 1 and 2, a transmission device 10 according to one embodiment of the present invention is provided mainly with a motor for output rotation number control 11 that is an example of first driving means, an input means 12, an eccentric guiding plate 13, an input motor 14 that is an example of second driving means, an internal/external gear wheel 15, an output means 16, a casing 17, an external gear wheel 18, and an internal gear wheel 19. The input means 12, the eccentric guiding plate 13, the internal/external gear wheel 15, part of the output means 16, the external gear wheel 18, and the internal gear wheel 19 are placed inside the casing 17 having a nearly flat columnar shape. Part of the output means 16 is projecting from an upper surface side (a circular surface side at one end, and the left side in FIG. 1, which will hereinafter be also referred to as "the output side" or "one side") of the casing 17, and the motor for output rotation number control 11 and the input motor 14 are arranged at an external portion of an undersurface side (a circular surface side at the other end, and right side in FIG. 1 which will hereinafter be also referred to as "the input side" or "the other side") of the casing 17.

In FIG. 2, approximately one third of the cutout section on the upper right is a schematic view (a schematic view seen from the input side) of the inside of the casing 17 having the eccentric guiding plate 13 removed and viewed from the front. Approximately one third of the cutout section on the bottom is a schematic view of the inside of the casing 17 further having the internal/external gear wheel 15 removed and viewed from the front.

The motor for output rotation number control 11 is arranged at a near center of the outer side of the undersurface (circular surface) of the casing 17. The motor for output rotation number control 11 is a publicly-known motor having a structure that transduces electric energy into rotational energy. The motor for output rotation number control 11 is configured to be capable of controlling the number and direction (normal rotations and reverse rotations) of rotations.

The input means 12 is rotatably supported in a state of being connected to the motor for output rotation number control 11, and rotates by means of the motor for output rotation number control 11. The input means 12 is arranged inside the casing 17 in a manner that makes this axial center X (hereinafter also referred to as "the rotational center X") of the input means 12 identical with the axial center X of the casing 17. The input means 12 is provided with a main axis portion 20, a disk portion 21, and external cogs 22, and they are integrally formed of a metal material. The main axis portion 20 has a columnar shape of which the input side (the other side) becomes directly joined to the motor for output rotation number control 11. The disk portion 21 becomes formed on the output side (one side) of the main axis portion 20 in a state of being perpendicular to and coaxial with the main axis portion 20. The external cogs 22 become formed on the surface of the side of the motor for output rotation number control 11 (the input side) of the disk portion 21 in a state of being coaxial with the main axis portion 20 and the disk portion 21. That is, it is a structure in which external gear wheel having the external cogs 22 is coaxially laminated on the surface of the input side of the disk portion 21. A diameter of the external cogs 22 (the external gear wheel having the external cogs 22) is smaller than that of the disk portion 21 and larger than that of the main axis portion 20.

One end of the input means 12 (end on the output side; the disk portion 21) is supported by the output means 16 through a plain bearing 36 (such as babbit metal). The other end (end on the input side; end on the input side of the main axis portion 20) of the input means 12 is supported by the casing 17 through a roller bearing 23. As just described, the input means 12 is supported in a manner capable of rotating normally and reversely.

The eccentric guiding plate 13 is a nearly circular metal plate having a hole 24 formed in the center. The eccentric guiding plate 13 is rotatably supported with the axial center aligned with the input means 12. Specifically, the eccentric guiding plate 13 becomes arranged coaxially with respect to the disk portion 21 of the input means 12 on the side of the motor for output rotation number control 11 inside the casing 17. In this case, the main axis portion 20 of the input means 12 penetrates through the hole 24 at the center of the eccentric guiding plate 13. The center side of the eccentric guiding plate 13 is supported by the casing 17 through a roller bearing 25, and the outer edge side of the eccentric guiding plate 13 is supported by the output means 16 through a roller bearing 26.

On the surface of the input side of the eccentric guiding plate 13, external cogs 27 coaxial with the eccentric guiding plate 13 itself are formed. These external cogs 27 are, as will be described later, engaged with an external gear wheel 28 that is an example of power transmitting means. On the surface of the output side of the eccentric guiding plate 13, an annular and concave eccentric guiding portion 29 having an eccentric position Y (hereinafter also simply referred to as "The position Y" and "the axial center Y") as an axial center is formed, the eccentric position Y being different from the rotational center of the eccentric guiding plate 13 itself.

The input motor 14 is arranged on the outer edge portion of the outer side of the undersurface (the circular surface) of the casing 17. The input motor 14 is also a publicly-known motor having a structure that transduces electric energy into rotational energy, as with the motor for output rotation number control 11. The input motor 14 is configured to be capable of controlling at least rotation directions (normal rotations and reverse rotations). The input motor 14 is connected with the external gear wheel 28, and is capable of rotating the eccentric guiding plate 13 in both the normal and reverse directions through the external gear wheel 28 by means of the rotations of the input motor 14.

The internal/external gear wheel 15 is formed of a metal material, and arranged on the output side (the side of the eccentric guiding portion 29) of the eccentric guiding plate 13. The internal/external gear wheel 15 has a first cylindrical guiding portion 30 formed on the surface of the input side (surface opposed to the eccentric guiding plate 13) and to be guided by the eccentric guiding portion 29 of the eccentric guiding plate 13. The first cylindrical guiding portion 30 and the eccentric guiding portion 29 have the same diameter, and the first cylindrical guiding portion 30 is slidably fit in the eccentric guiding portion 29. An axial center of the first cylindrical guiding portion 30 becomes the eccentric position Y of the eccentric guiding portion 29. The internal/external gear wheel 15 has a second cylindrical guiding portion 31 formed on the surface of the output side (one side), and having an axial center at the same position Y as the first cylindrical guiding portion 30, and having the same diameter as the first cylindrical guiding portion 30. The internal/external gear wheel 15 has external cogs 32 and internal cogs 33. Axial centers of these external cogs 32 and internal cogs 33 are the same as the axial center Y of the first cylindrical guiding portion 30 and the second cylindrical guiding portion 31.

The output means 16 is provided with a main axis portion 34 projecting from the upper surface side of the casing 17, and a cylindrical portion 35 coaxially connected with one end of the input side of the main axis portion 34 and to be arranged inside the casing 17. The output means 16, that is, the main axis portion 34 and the cylindrical portion 35, has the same axis (rotational center X) as the input means 12. The main axis portion 34 and the cylindrical portion 35 are formed integrally of a metal material. Major part of the input means 12, the eccentric guiding plate 13, the internal/external gear wheel 15, the external gear wheel 18, and the internal gear wheel 19 are placed inside the cylindrical portion 35. The output means 16 (main axis portion 34) is supported by the casing 17 through a roller bearing 41.

At a position opposed to the internal/external gear wheel 15 on the inside of the cylindrical portion 35, the internal cogs 37 are formed. These internal cogs 37 have the same rotational center as the input means 12 (the rotational center X). The internal cogs 37 (a gear wheel structure formed by the internal cogs 37) have a diameter larger than that of the external cogs 32 of the internal/external gear wheel 15 (the internal/external gear wheel 15 itself), and are engaged with these external cogs 32.

The external gear wheel 18 is a metallic gear wheel, and rotatably fit in and attached to the main axis portion 20 of the input means 12. The external gear wheel 18 has external cogs 38 having the same shape (including having the same size) as the external cogs 22 of the input means 12. The external gear wheel 18 is in a state of being overlapped with the external cogs 22 of the input means 12. Part of the external cogs 38 of the external gear wheel 18 (part of the input side) is engaged with the internal cogs 33 of the internal/external gear wheel 15. As will be described later, other part of the external cogs 38 of the external gear wheel 18 (part of the output side) is engaged with internal cogs 40 of the internal gear wheel 19.

The internal gear wheel 19 is a metallic gear wheel, and arranged in between the disk portion 21 of the input means 12 and the internal/external gear wheel 15. On the surface of the input side (the side of the internal/external gear wheel 15) of the internal gear wheel 19, a groove-like, annular guiding portion 39 to be guided by the second cylindrical guiding portion 31 of the internal/external gear wheel 15 is formed. The annular guiding portion 39 is in a shape corresponding to the second cylindrical guiding portion 31. The second cylindrical guiding portion 31 of the internal/external gear wheel 15 is slidably fit in the annular guiding portion 39 of the internal gear wheel 19. That is, the annular guiding portion 39 of the internal gear wheel 19 also has the same axial center Y as the second cylindrical guiding portion 31 of the internal/external gear wheel 15, and has the same diameter as the second cylindrical guiding portion 31 of the internal/external gear wheel 15 as well. The internal gear wheel 19 has a diameter larger than the diameters of the superimposed external cogs 22 of the input means 12 and the superimposed external cogs 38 of the external gear wheel 18 (the external cogs 22 and the external cogs 38 have the same diameter), and has the internal cogs 40 that engage with them (the external cogs 22 of the input means 12 and the external cogs 38 of the external gear wheel 18). As will be described later, the internal gear wheel 19 revolves along with the revolving of the internal/external gear wheel 15.

Here, a thickness of the internal gear wheel 19 is larger than that of the external cogs 22 of the input means 12, and smaller than the sum of thicknesses of the external cogs 22 of the input means 12 and the external cogs 38 of the external gear wheel 18. Therefore, the internal cogs 40 of the internal gear wheel 19 engage with the external cogs 22 of the input means 12 and the external cogs 38 of the external gear wheel 18, and the external cogs 38 of the external gear wheel 18 are capable of engaging with the internal cogs 40 of the internal gear wheel 19 and the internal cogs 33 of the internal/external gear wheel 15.

In the case of this transmission device 10, the disk portion 21 and the external cogs 22 of the input means 12, the second cylindrical guiding portion 31 of the internal/external gear wheel 15, the external gear wheel 18, and the internal gear wheel 19 each play a part in the feature for joining gear wheels that joins (gear-couples) the internal cogs 33 of the internal/external gear wheel 15 and the input means 12 (the main axis portion 20). Also, in the case of this transmission device 10, due to this feature for joining gear wheels, in accordance with a difference in the number of rotations between the input means 12 and the eccentric guiding plate 13, the internal/external gear wheel 15 revolves along the eccentric guiding portion 29 while rotating at the same time. Descriptions will be given hereunder on the behaviors of the transmission device 10, including descriptions on the revolving of the internal/external gear wheel 15.

First, descriptions will be given on a condition where the motor for output rotation number control 11 is non-driven.

Here, if the input motor 14 is rotationally driven in one direction, the external gear wheel 28 joined to the input motor 14 rotates, and the eccentric guiding plate 13 having the external cogs 27 engaged with this external gear wheel 28 rotates centering on the axial center X of the input means 12. The first cylindrical guiding portion 30 of the internal/external gear wheel 15 is guided by the eccentric guiding portion 29 of the eccentric guiding plate 13. Therefore, in association with the rotations of the eccentric guiding plate 13, the internal/external gear wheel 15 revolves around the input means 12 along with the eccentric guiding portion 29 while rotating by itself at the same time. In this case, force of rotation opposite (opposite direction) to the rotations of the eccentric guiding plate 13 becomes added by the internal/external gear wheel 15 to the external gear wheel 18 having the external cogs 38 to be engaged with the internal cogs 33 of the internal/external gear wheel 15.

Here, when focusing on the internal gear wheel 19, the internal gear wheel 19 is arranged in between the internal/external gear wheel 15 and the disk portion 21 of the input means 12, and the annular guiding portion 39 of this internal gear wheel 19 is slidably fit in the second cylindrical guiding portion 31 of the internal/external gear wheel 15. Therefore, the internal gear wheel 19 revolves along with the revolving of the internal/external gear wheel 15. On the other hand, the disk portion 21 is rotatably arranged on the cylindrical portion 35 of the output means 16 through the plain bearing 36. Here, if the disk portion 21 rotates along with the revolving of the internal gear wheel 19 at a same speed, the external cogs 22 also rotate along with the disk portion 21. Therefore, only the revolving occurs in the internal gear wheel 19, and the rotations by itself (the rotations of the internal gear wheel 19 itself due to the engaging of the external cogs 22 with the internal cogs 40 of the internal gear wheel 19) do not occur. However, since the external cogs 22 and the external cogs 38 of the external gear wheel 18 under a load of inverse rotation, together with each other, are engaged with the internal cogs 40 of the internal gear wheel 19, the external cogs 22 and the disk portion 21 do not rotate along with the revolving of the internal gear wheel 19. Thus, due to the engaging of the non-rotating external cogs 22 with the internal cogs 40, rotations by itself occur in the internal gear wheel 19 in association with the revolving and in a direction of the revolving. As just described, when the motor for output rotation number control 11 is not driven, the internal gear wheel 19 revolves while rotating by itself (rotating in a normal direction), thereby keeping the external gear wheel 18 having the external cogs 38 engaging with the internal cogs 40 of this internal gear wheel 19 in a state where inverse rotations do not occur in spite of being under the load of inverse rotation.

As described above, since the external gear wheel 18 does not rotate in an inverse direction due to the feature for joining gear wheels having the above structure, the internal/external gear wheel 15 is able to revolve along the internal cogs 37 of the output means 16 (the cylindrical portion 35) while rotating by itself (rotating in a direction opposite to the revolving direction) centering on the eccentric position Y, rotating the cylindrical portion 35 (the output means 16) at a slowed speed in a same direction as the eccentric guiding plate 13. At this point, that is, the state in which the motor for output rotation number control 11 is not driven provides the maximum speed reduction ratio. In other words, at this moment, with respect to the rotations of the eccentric guiding plate 13 or the input motor 14, not only the revolving speed of the internal/external gear wheel 15, but also the rotating speed of the output means 16 becomes the slowest.

Next, descriptions will be given on a condition where the motor for output rotation number control 11 is driven in a direction of rotations of the input means 12 performed in the same direction as the eccentric guiding plate 13. The input motor 14 is rotationally driven as with the above case. At this point, due to the engaging of the internal gear wheel 19 by means of the internal cogs 40, the external gear wheel 18 also rotates integrally with the input means 12. Since the external gear wheel 18 rotates in the same direction as the eccentric guiding plate 13 in this manner, as compared with the case where the external gear wheel 18 is fixed, the rotating speed (revolving speed) of the internal/external gear wheel 15 engaged with the external cogs 38 of this external gear wheel 18 becomes faster. That is, by rotationally driving the motor for output rotation number control 11 in the same direction as the eccentric guiding plate 13, the speed reduction ratio can be made smaller (the rotating speed of the output means 16 can be made faster). These changes in speed can be made in a non-step manner by changing the number of rotations of the motor for output rotation number control 11 in a non-step way. Also, when the number of rotations of the motor for output rotation number control 11 is made equal to the number of rotations of the eccentric guiding plate 13, the number of rotations of the eccentric guiding plate 13 becomes the number of rotations of the output means 16 without any change, keeping the rotating speed from becoming slower.

The feature for joining gear wheels of this transmission device 10 is, as just described, formed by the joining of a plurality of gear wheels. Therefore, the feature for joining gear wheels behaves in the same way also in a case where the direction of rotations of the input motor 14 (and the motor for output rotation number control 11) is reversed.

As just described, in the case of the transmission device 10, for example, when the number of rotations of the input motor 14 (the eccentric guiding plate 13) is made to be constant, by controlling the number of rotations of the motor for output rotation number control 11 (the input means 12), the number of rotations of the output means 16 can be controlled (accelerated/decelerated) in a non-step way. Especially, in the case of the transmission device 10, as described earlier, non-step changes in speed can be made in the same way in both the normal rotations and the reverse rotations, the number of components is small, the transmission device 10 is compact, and the structure of the transmission device 10 is simplified. By means of such the structure of the transmission device 10, the engaged gear wheels are less prone to displacement in the case of changing between the normal rotations and reverse rotations, and backlash of each gear wheel can be reduced. The transmission device 10 can be used suitably as a transmission of an electric automobile and the like.

The present invention is not limited to the above embodiment, and the structure can be changed within the scope that does not alter the gist of the present invention. For example, a motor for rotating an eccentric guiding plate (the input motor 14 in the case of the transmission device 10) can be used for the control of the number of rotations of an output means by making the number of rotations of a motor directly connected to an input means (the motor for output rotation number control 11 in the case of the transmission device 10) constant. Each gear wheel and the like can be formed of a material other than metal, for example, such as an engineering plastics and the like. Also, as a driving means, power of those other than motors such as engines may be used as well.

INDUSTRIAL APPLICABILITY

The transmission device according to the present invention can be used suitably for automobiles starting with electric automobiles, motorcycles, electric rolling stocks, elevators, industrial machinery, robots and the like.

REFERENCE SIGNS LIST

10: transmission device, 11: motor for output rotation number control, 12: input means, 13: eccentric guiding plate, 14: input motor, 15: internal/external gear wheel, 16: output means, 17: casing, 18: external gear wheel, 19: internal gear wheel, 20: main axis portion. 21: disk portion, 22: external cogs, 23: roller bearing, 24: hole, 25: roller bearing, 26: roller bearing, 27: external cogs, 28: external gear wheel, 29: eccentric guiding portion, 30: first cylindrical guiding portion, 31: second cylindrical guiding portion, 32: external cogs, 33: internal cogs, 34: main axis portion, 35: cylindrical portion, 36: plain bearing, 37: internal cogs, 38: external cogs, 39: annular guiding portion, 40: internal cogs, 41: roller bearing

The invention claimed is:

1. A transmission device, comprising:
a first driving means;
an input means rotatably supported and to be connected to the first driving means;
an eccentric guiding plate having an axial center aligned with the input means, rotatably supported, and having an annular eccentric guiding portion on one side, the annular eccentric guiding portion having an axial center at an eccentric position different from the axial center of the input means;
a second driving means rotating the eccentric guiding plate;
an internal/external gear wheel formed opposed to the eccentric guiding plate, having a first cylindrical guiding portion to be guided by the eccentric guiding portion, and also having external cogs and internal cogs provided centering on a center position of the first cylindrical guiding portion; and
an output means having a same axial center as the input means and also having internal cogs engaging with the external cogs of the internal/external gear wheel, the internal cogs of the internal/external gear wheel being connected to a main axis portion of the input means through a feature for joining gear wheels, the internal/external gear wheel revolving along the eccentric guiding portion while rotating in accordance with a difference in the number of rotations between the input means and the eccentric guiding plate,
wherein the feature for joining gear wheels comprises:
a disk portion and external cogs forming the input means and provided coaxially;
a second cylindrical guiding portion provided on one side of the internal/external gear wheel with the axial center aligned with the first cylindrical guiding portion;
an external gear wheel rotatably set in and attached to the input means and having external cogs in a same shape as the external cogs of the input means and engaging with the internal cogs of the internal/external gear wheel; and
an internal gear wheel having internal cogs engaging with the external cogs of the input means and the external cogs of the external gear wheel, and also having an annular guiding portion to be guided by the second cylindrical guiding portion, the internal gear wheel arranged in between the disk portion and the internal/external gear wheel and revolving along with the revolving of the internal/external gear wheel.

2. The transmission device according to claim 1, wherein the first driving means is used for controlling the number of rotations of the output means.

3. The transmission device according to claim 1, wherein the input means is supported by bearings in a manner that enables the input means to rotate in both normal and reverse directions.

4. The transmission device according to claim 2, wherein the input means is supported by bearings in a manner that enables the input means to rotate in both normal and reverse directions.

5. The transmission device according to claim 1, wherein the first and second driving means each are a motor, and the second driving means rotates the eccentric guiding plate through a power transmitting means.

6. The transmission device according to claim 2, wherein the first and second driving means each are a motor, and the second driving means rotates the eccentric guiding plate through a power transmitting means.

7. The transmission device according to claim 3, wherein the first and second driving means each are a motor, and the second driving means rotates the eccentric guiding plate through a power transmitting means.

8. The transmission device according to claim 4, wherein the first and second driving means each are a motor, and the second driving means rotates the eccentric guiding plate through a power transmitting means.

* * * * *